US006564443B2

(12) United States Patent
Oishi et al.

(10) Patent No.: US 6,564,443 B2

(45) Date of Patent: May 20, 2003

(54) METHOD FOR MANUFACTURING ELECTROMAGNETIC OPERATING APPARATUS

(75) Inventors: Kenichi Oishi, Obu (JP); Motoyoshi Ando, Nagoya (JP)

(73) Assignee: Denso Corporation (JP)

(*) Notice: Subject to any disclaimer, the term of this patent is extended or adjusted under 35 U.S.C. 154(b) by 15 days.

(21) Appl. No.: 09/900,198

(22) Filed: Jul. 9, 2001

(65) Prior Publication Data

US 2002/0007549 A1 Jan. 24, 2002

(30) Foreign Application Priority Data

Jul. 11, 2000 (JP) ....................................... 2000-209778

(51) Int. Cl.⁷ ................................................ H02K 15/16

(52) U.S. Cl. .......................... 29/596; 335/260; 335/299

(58) Field of Search ............................ 29/596; 335/260, 335/299

(56) References Cited

U.S. PATENT DOCUMENTS 3,331,042 A * 7/1967 Erickson et al.
3,451,021 A * 6/1969 Atherton
3,605,054 A * 9/1971 Conrath
5,769,391 A 6/1998 Noller et al.

FOREIGN PATENT DOCUMENTS

JP 10-299932 11/1998

* cited by examiner

*Primary Examiner*—Carl J. Arbes
(74) *Attorney, Agent, or Firm*—Nixon & Vanderhye PC

(57) ABSTRACT

An accommodating base material and an attracting base material are coaxially arranged, and are resin-insert-molded, thereby forming a bobbin base material. Next, inner peripheries of the accommodating base material, attracting base material and bobbin base material are cut, so that the accommodating base material, attracting base material and bobbin base material have same inner diameters. As a result of the cut-forming process, an accommodating member, an attracting member and a bobbin are formed. After insert-molding, the accommodating base material, attracting base material and bobbin base material are cut to have the same inner diameters. Thus, the accommodating member and the attracting member are accurately coaxially formed.

15 Claims, 7 Drawing Sheets

METHOD FOR MANUFACTURING ELECTROMAGNETIC OPERATING APPARATUS

CROSS REFERENCE TO RELATED APPLICATION

This application is based on and incorporates herein by reference Japanese Patent Application No. 2000-209778 filed on Jul. 11, 2000.

BACKGROUND OF THE INVENTION

1. Field of the Invention

The present invention relates to a method for manufacturing an electromagnetic operating apparatus.

2. Description of Related Art

JP-A-10-299932 discloses an electromagnetic operating apparatus in which a first yoke and a second yoke are formed independently from each other. In the electromagnetic operating apparatus, a bobbin around which a soil is wound supports a plunger as a moving core. Thus, even when axes of the first and second yokes are diverted from each other, the plunger is not prevented from reciprocating.

U.S. Pat. No. 5,769,391 discloses an electromagnetic valve in which an accommodating member and an attracting member are integrally formed to provided a stator core. In the electromagnetic valve, since there is no assembling error, the accommodating member and the attracting member are accurately coaxially arranged. However, when thickness of a connecting portion between the accommodating member and the attracting member is small, the stator core might be transformed by a force forming a resin bobbin at outer peripheries of the accommodating member and the attracting member, or by a force for winding a coil around the bobbin. If the thickness of the connecting portion is set to large for preventing the transformation of the stator core, an amount of magnetic flux flowing between the accommodating member and the attracting member via the connecting portion increases. Whereby, generated magnetic force becomes small relative to an electric current supplied into the coil.

SUMMARY OF THE INVENTION

An object of the present invention is to arrange an accommodating member and an attracting member accurately coaxially, and to increase an attracting force generated between the attracting member and a moving core.

According to a first aspect of the present invention, an accommodating base material and an attracting base material, which is independent from the accommodating base material, are resin-insert-molded. After that, the accommodating and attracting base materials are processed to form an accommodating member and an attracting member to accommodate a moving core such that the moving core reciprocates therein. Even if axes of the accommodating base material and attracting base material are diverted from each other when they are insert-molded, the accommodating member and attracting member are accurately coaxially arranged by processing the accommodating and attracting base materials after the insert-molding. Thus, a radial clearance between the accommodating member and the moving core, and between the attracting member and the moving core are made as small as possible, thereby increasing a force attracting the moving core.

According to a second aspect of the present invention, the accommodating and attracting base materials are processed after winding the coil around the bobbin. Thus, a force for winding the coil around the bobbin does not act on the accommodating member and the attracting member. As a result, axes of the accommodating member and the attracting member are prevented from being diverted from each other.

According to a third aspect of the present invention, a stator core base material, which includes base materials of the accommodating member and attracting member, and which includes a thin thick portion integrally formed to connect the base materials to each other, is resin-insert-molded. After that, the resin-insert-molded stator core base material is processed for forming a stator core to accommodate the moving core such that the moving core reciprocates therein. Even when axes of the accommodating base material and attracting base material are diverted from each other due to a pressure during the insert-molding, the accommodating member and attracting member are accurately coaxially arranged by processing the stator core base material after the insert-molding. Thus, a radial clearance between the accommodating member and the moving core, and between the attracting member and the moving core are made as small as possible, thereby increasing a force attracting the moving core.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
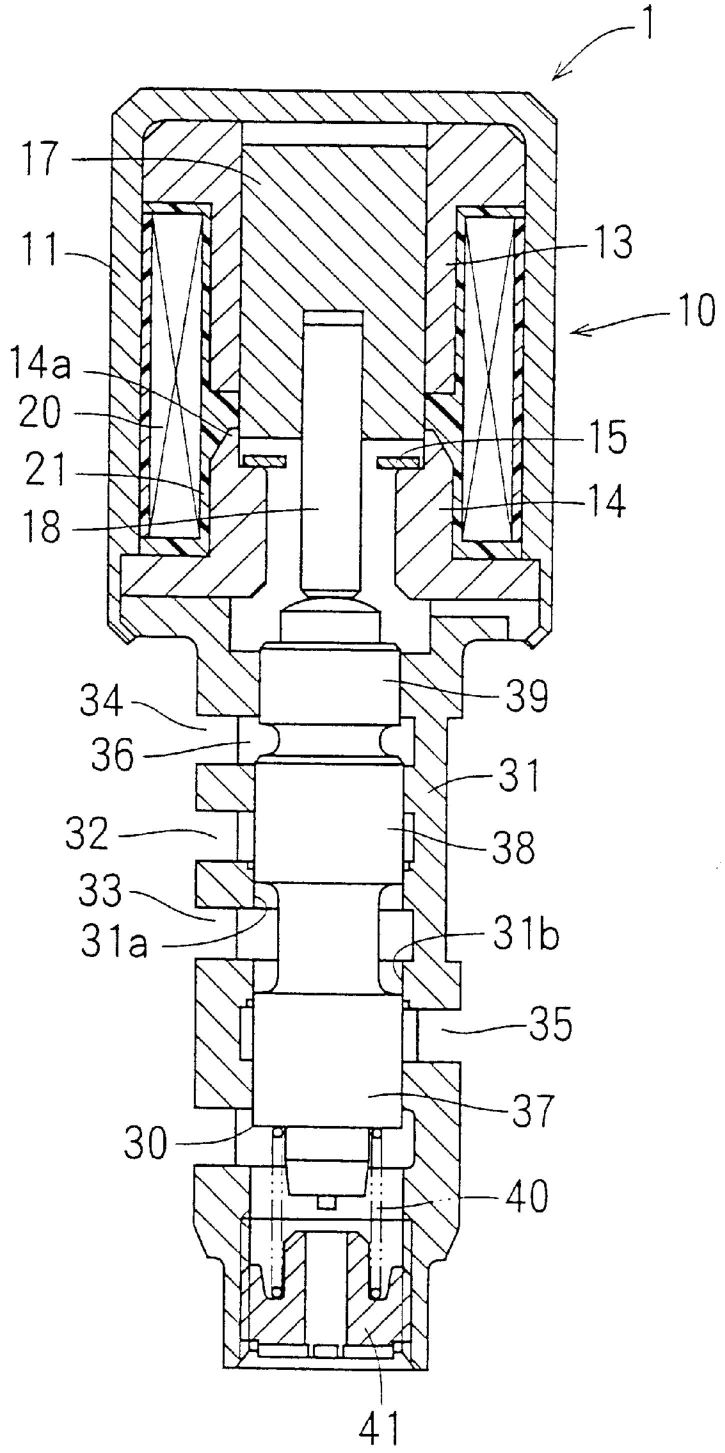
FIG. 1 is a cross-sectional view showing an electromagnetic valve (first embodiment)

FIG. 1 shows an electromagnetic valve 1 including an electromagnetic operating apparatus in the first embodiment.

The electromagnetic valve 1 is a spool type oil pressure control valve to control an oil pressure of working oil. The working oil is supplied to an oil pressure control apparatus used for an automatic transmission of vehicle.

A linear solenoid 10 works as the electromagnetic operating apparatus, and includes a yoke 11, an accommodating member 13, an attracting member 14, a plunger 17, a shaft 18, and a coil 20. The yoke 11 is cylindrically formed and has a bottom. The plunger 17 works as a moving core. The yoke 11, accommodating member 13 and attracting member 14 form a stator core. The yoke 11, accommodating member 13, attracting member 14 and plunger 17 are made of magnetic material, and form a magnetic circuit.

A housing 31 supports a spool 30 such that the spool 30 reciprocates therein. The yoke 11 is mechanically fixed to the housing 31 to fix the attracting member 14 between the yoke 11 and the housing 31.

The accommodating member 13 supports the plunger 17 such that the plunger 17 reciprocates therein. Nickel-phosphorus plating is provided on the inner wall of the accommodating member 13 to reduce a sliding resistance between the plunger 17 and the inner wall of the accommodating member 13.

The attracting member 14 generates an attracting force and includes a guide portion 14*a* for guiding the plunger 17. When the coil 20 is energized, the attracting member 14 generates the attracting force to attract the plunger 17. A stopper 15 made of nonmagnetic material is provided at a top face of the attracting member 14 axially facing the plunger 17.

Top end of the shaft 18 is press-inserted into the plunger 17. Bottom end of the shaft 18 contacts a top end of the spool 30.

The coil 20 is wound around a bobbin 21 made of resin. When an electric current is supplied into the coil 20 through a terminal (not illustrated) electrically connected to the coil 20, a magnetic flux flows in the magnetic circuit, thereby generating a magnetic attracting force between the attracting member 14 and the plunger 17. Then, the plunger 17 and the shaft 18 move downwardly in FIG. 1. Downward movement of the plunger 17 is restricted by the stopper 15.

The spool 30 always contacts the shaft 18 of the linear solenoid 10. The movement of the plunger 17 is transmitted to the spool 30 through the shaft 18, and the spool 30 reciprocates in the housing 31. The housing 31 includes an inlet port 32, an outlet port 33, a feedback port 34, and a discharge port 35. A pump feeds the working oil from a tank (not illustrated) to the inlet port 32. The working oil is supplied from the outlet port 33 to an engaging device of the automatic transmission. The outlet port 33 communicates with the feedback port 34 at the outside of the electromagnetic valve 1. The working oil discharged from the outlet port 33 is partially introduced into the feedback port 34. A feedback chamber 36 communicates with the feedback port 34. The working oil is discharged from the discharge port 35 into the tank.

The spool 30 includes a first large diameter land 37, a second large diameter land 38, and small diameter land 39 orderly from the bottom side (opposite liner solenoid side) thereof. An outer diameter of the small diameter land 39 is smaller than those of the large diameter lands 37 and 38.

The feedback chamber 36 is formed between the second large diameter land 38 and the small diameter land 39. Since the outer diameters of these lands 38, 39 are different, surface areas on which pressure of the feed-backed working oil acts are different. Thus, the oil pressure in the feedback chamber 36 presses the spool 30 downwardly in FIG. 1. In the electromagnetic valve 1, the discharged oil pressure is partially feed-backed for preventing a discharged oil pressure fluctuation due to a supplied oil pressure fluctuation. The spool 30 is placed at a position where an urging force of the spring 40, a force of the shaft 18 pressing the spool 30 when the attracting member 14 attracts the plunger 17 due to the electric current supplied into the coil 20, and a force the spool 30 receives from the oil pressure in the feedback chamber 36 are balanced.

The spring 40 is provided at the bottom (opposite linear solenoid side) of the spool 30, and urges the spool 30 upwardly, i.e., toward the linear solenoid 10. An adjust screw 41 adjusts a load of the spring 40 in accordance with the screwed amount thereof.

An amount of the working oil flowing from the inlet port 32 to the outlet port 33 is determined based on a seal length between an inner wall 31*a* of the housing 31 and an outer wall of the second large diameter land 38. The seal length means an overlapped length between the inner wall 31*a* of the housing 31 and an outer wall of the second large diameter land 38. As the seal length decreases, the working oil amount flowing from the inlet port 32 to the outlet port 33 increases. As the seal length increases, the working oil amount flowing from the inlet port 32 to the outlet port 33 decreases. Similarly, working oil amount flowing from the outlet port 33 to the discharge port 35 is determined based on a seal length between the inner wall 31*b* of the housing 31 and an outer wall of the first large diameter land 37.

When the coil 20 is energized, the spool 30 moves downwardly in FIG. 1, i.e., toward the spring 40. Since the seal length between the inner wall 31*a* and the second large diameter land 38 increases and the seal length between the inner wall 31*b* and the first large diameter land 37 decreases, the working oil amount flowing from the inlet port 32 to the outlet port 33 decreases and the working oil amount flowing from the outlet port 33 to the discharge port 35 increases. As a result, the pressure of the working oil discharged from the outlet port 33 decreases.

When the spool 30 moves toward the linear solenoid 10, since the seal length between the inner wall 31*a* and the second large diameter land 38 decreases and the seal length between the inner wall 31*b* and the first large diameter land 37 increases, the working oil amount flowing from the inlet port 32 to the outlet port 33 increases and the working oil amount flowing from the outlet port 33 to the discharge port 35 decreases. As a result, the pressure of the working oil discharged from the outlet port 33 increases.

In the electromagnetic valve 1, electric current supplied into the coil 20 is controlled to adjust the force of the linear solenoid 10 pressing the spool 30 downwardly, and to adjust the pressure of the working oil discharge from the outlet port 33. The pressure of the working oil discharged from the outlet port 33 decreases in proportion to the electric current supplied into the coil 20. In this way, by controlling the electric current supplied into the coil 20, position of the spool 30 is controlled to adjust the pressure of the working oil supplied into the automatic transmission.

A manufacturing process of the linear solenoid 10 will be explained with reference to FIG. 2.

Figure 2A:
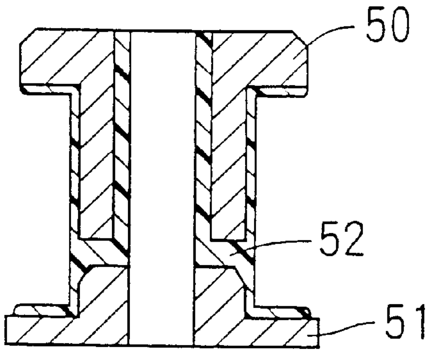
FIGS. 2A–2C are cross-sectional views showing a manufacturing process of an accommodating member, an attracting member and a bobbin (first embodiment)

As shown in FIG. 2A, an accommodating base material 50 of the accommodating member 13 and an attracting base material 51 of the attracting member 14 are coaxially arranged, and are resin-insert-molded, thereby forming a bobbin base material 52 for the bobbin 52.

Figure 2B:
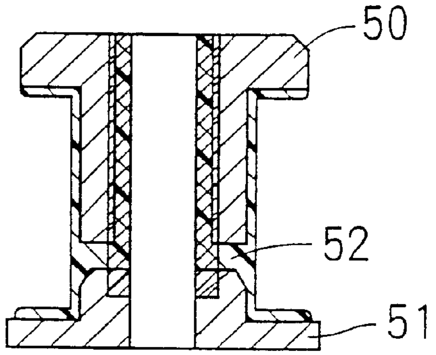

Next, as shown in FIG. 2B, inner peripheries of the accommodating base material 50, attracting base material 51 and bobbin base material 52 are cut from the opposite attracting base material 51 side to the attracting base material 51 side, so that the accommodating base material 50, attracting base material 51 and bobbin base material 52 have same inner diameters.

Figure 2C:
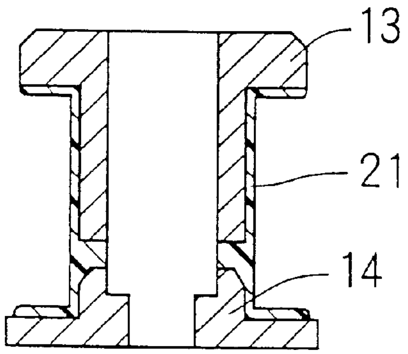

As a result of the cut-forming process shown in FIG. 2B, the accommodating member 13, the attracting member 14 and the bobbin 21 are formed as shown in FIG. 2C.

Even when the accommodating base material 50 and the attracting base material 51 are coaxially insert-molded, axes thereof might be diverted from each other due to disposing errors of the accommodating base material 50 and the attracting base material 51. However, in the present first embodiment, after insert-molding, the accommodating base material 50, attracting base material 51 and bobbin base material 52 are cut to have the same inner diameters. Thus, the accommodating member 13 and the attracting member 14 are accurately coaxially formed. Since radial clearances between the plunger 17 and the accommodating member 13, and between the plunger 17 and the attracting member 14 are made as small as possible, attracting force generated between the attracting member 14 and the plunger 17 becomes large relative to the electric current supplied into the coil 20, thereby improving magnetic efficiency.

(Second Embodiment)

A manufacturing method of the linear solenoid in the second embodiment will be explained with reference to FIGS. 3A–3C.

Figure 3A:
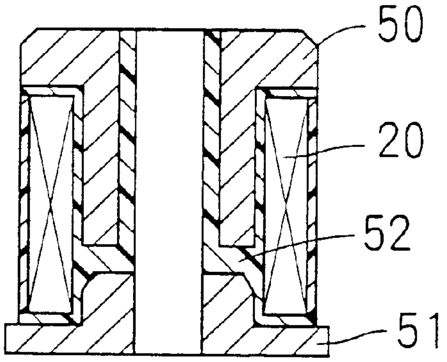
FIGS. 3A–3C are cross-sectional views showing a manufacturing process of an accommodating member, an attracting member and a bobbin (second embodiment)

As shown in FIG. 3A, an accommodating base material 50 and an attracting base material 51 are coaxially disposed, and are resin-insert-molded, thereby forming a bobbin base material 52. The coil 20 is wound around the bobbin base material 52.

Figure 3B:
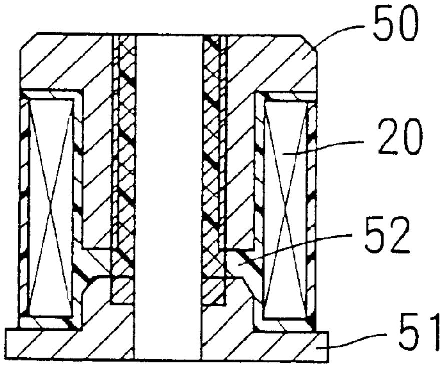

Next, as shown in FIG. 3B, inner peripheries of the accommodating base material 50, attracting base material 51 and bobbin base material 52 are cut from the opposite attracting base material 51 side to the attracting base material 51 side, so that the accommodating base material 50, attracting base material 51 and bobbin base material 52 have same inner diameters.

Figure 3C:
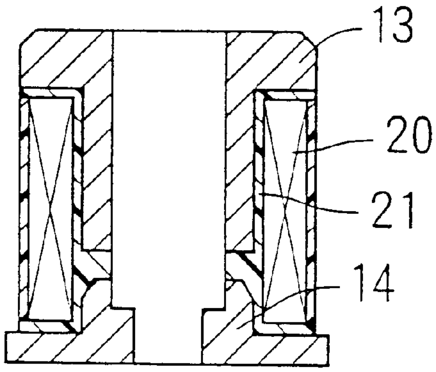

As a result of the cut-forming process shown in FIG. 3B, the accommodating member 13, the attracting member 14 and the bobbin 21 are formed as shown in FIG. 3C.

In the second embodiment, the base material 50, attracting base material 51 and bobbin base material 52 are cut after the coil 20 is wound around the bobbin base material 52. Thus, in comparison with first embodiment in which the coil 20 is wound after the cut-forming process, force for winding the coil 20 does not act on the accommodating member 13 and the attracting member 14. As a result, axes of the accommodating member 13 and the attracting member 14 are prevented from being diverted from each other.

(Third Embodiment)

Figure 4:
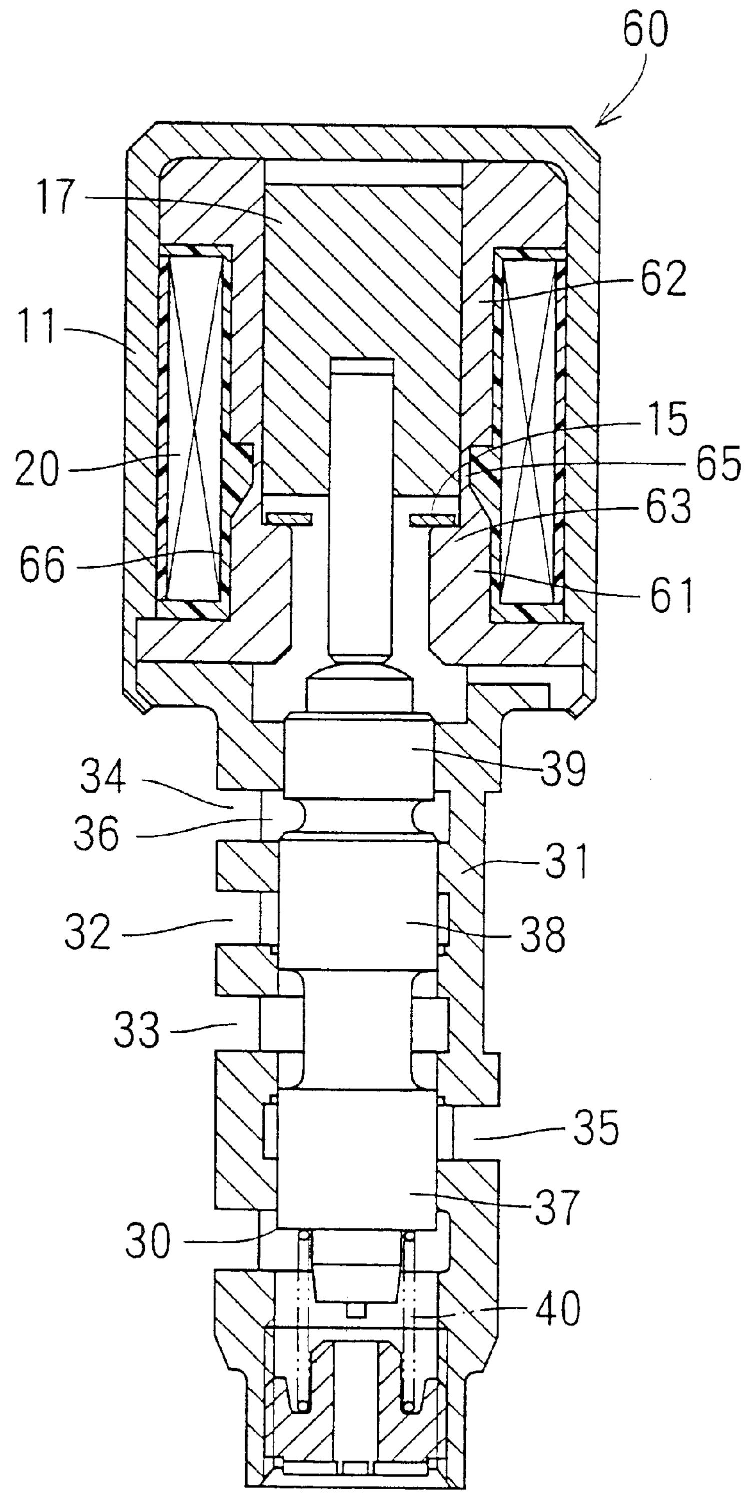
FIG. 4 is a cross-sectional view showing an electromagnetic valve (third embodiment)

FIG. 4 shows an electromagnetic valve in the third embodiment. A linear solenoid 60 works as an electromagnetic operating apparatus, and includes an accommodating member 62, an attracting member 63, and a thin thick portion 65. The accommodating member 62, the attracting member 63, and the thin thick portion 65 are integrally formed to provide a stator core 61. A cross-sectional area of the thin thick portion 65 is small, and the thin thick portion 65 works as a magnetic resistor for preventing magnetic flux from flowing between the accommodating member 62 and the attracting member 63.

A manufacturing process of the linear solenoid 60 will be explained with reference to FIGS. 5A–5C.

Figure 5A:
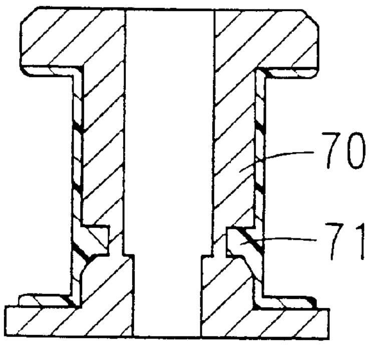
FIGS. 5A–5C are cross-sectional views showing a manufacturing process of an accommodating member, an attracting member and a bobbin (third embodiment)

As shown in FIG. 5A, a stator core base material 70 for the stator core 61 is resin-insert-molded, thereby forming a bobbin base material 71 for a bobbin 66.

Figure 5B:
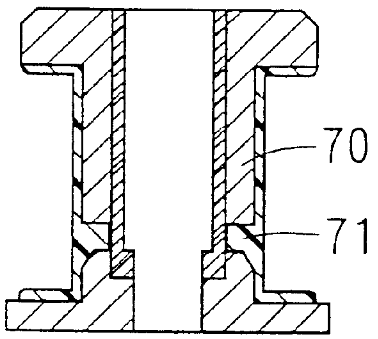
Figure 5C:
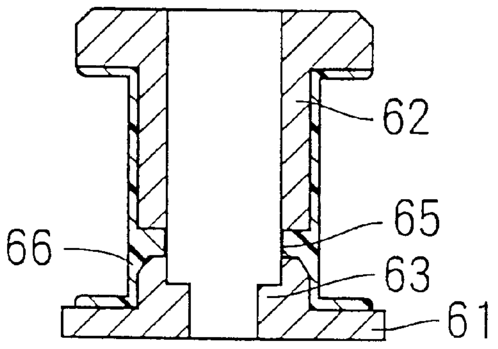

Next, as shown in FIG. 5B, inner periphery of the stator core base material 70 is cut from the accommodating member 62 side to the attracting member 63 side, so that the stator core base material 70 has a uniform inner diameter.

As a result of cut-forming process shown in FIG. 5B, the accommodating member 62, attracting member 63, thin thick portion 65, and bobbin 66 are formed.

Since the accommodating member 62 is connected to the attracting member 63 through the thin thick portion 65, surface for sliding with respect to the plunger 17 is formed of same material and with same roughness. Thus, the plunger 17 smoothly reciprocates in the accommodating member 62 and the attracting member 63.

(Fourth Embodiment)

A manufacturing method of the linear solenoid in the fourth embodiment will be explained with reference to FIGS. 6A–6C.

Figure 6A:
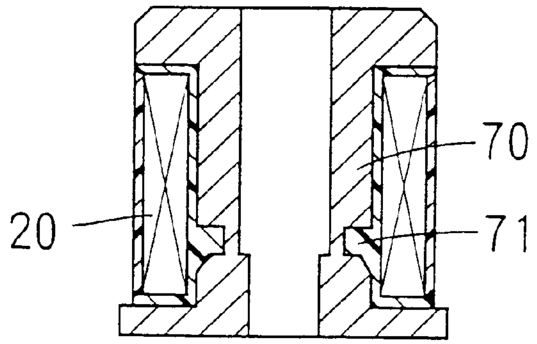
FIGS. 6A–6C are cross-sectional views showing a manufacturing process of an accommodating member, an attracting member and a bobbin (fourth embodiment)

As shown in FIG. 6A, the stator core base plate 70 is resin-insert-molded, thereby forming the bobbin base material 71. The coil 20 is wound around the bobbin base material 71.

Figure 6B:
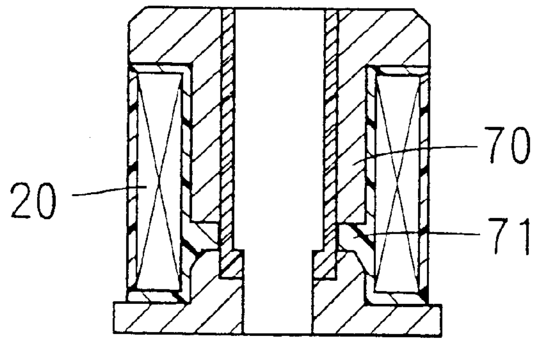
Figure 6C:
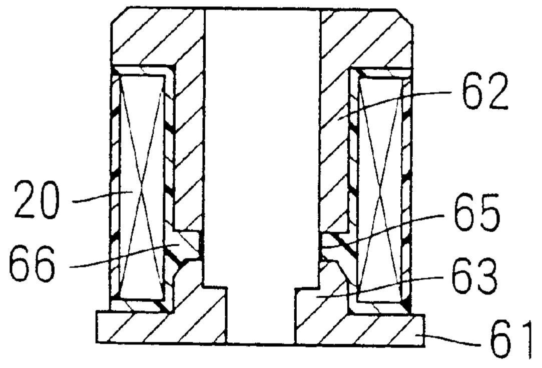

Next, as shown in FIG. 6B, inner periphery of the stator core base material 70 is cut from the accommodating member 62 side to the attracting member 63 side, so that the stator core base material 70 has a uniform inner diameter.

As a result of cut-forming process shown in FIG. 6B, the accommodating member 62, attracting member 63, thin thick portion 65, and bobbin 66 are formed.

In the fourth embodiment, the stator core base material 70 is cut after the coil 20 is wound around the bobbin base material 71. Thus, in comparison with the third embodiment in which the coil 20 is wound after the cut-forming process, force for winding the coil 20 does not act on the stator core 61. As a result, the stator core 61 is prevented from being transformed, thereby preventing axes of the accommodating member 62 and the attracting member 63 from being diverted from each other.

In the third and fourth embodiments, after the stator core base material 70 is cut to have the uniform inner diameter, the thin thick portion 65 is left for connecting the accommodating member 62 to the attracting member 63. Alternatively, the stator core base material 70 may be cut to remove the thin thick portion for dividing the accommodating member 62 from the attracting member 63.

(Fifth Embodiment)

Figure 7:
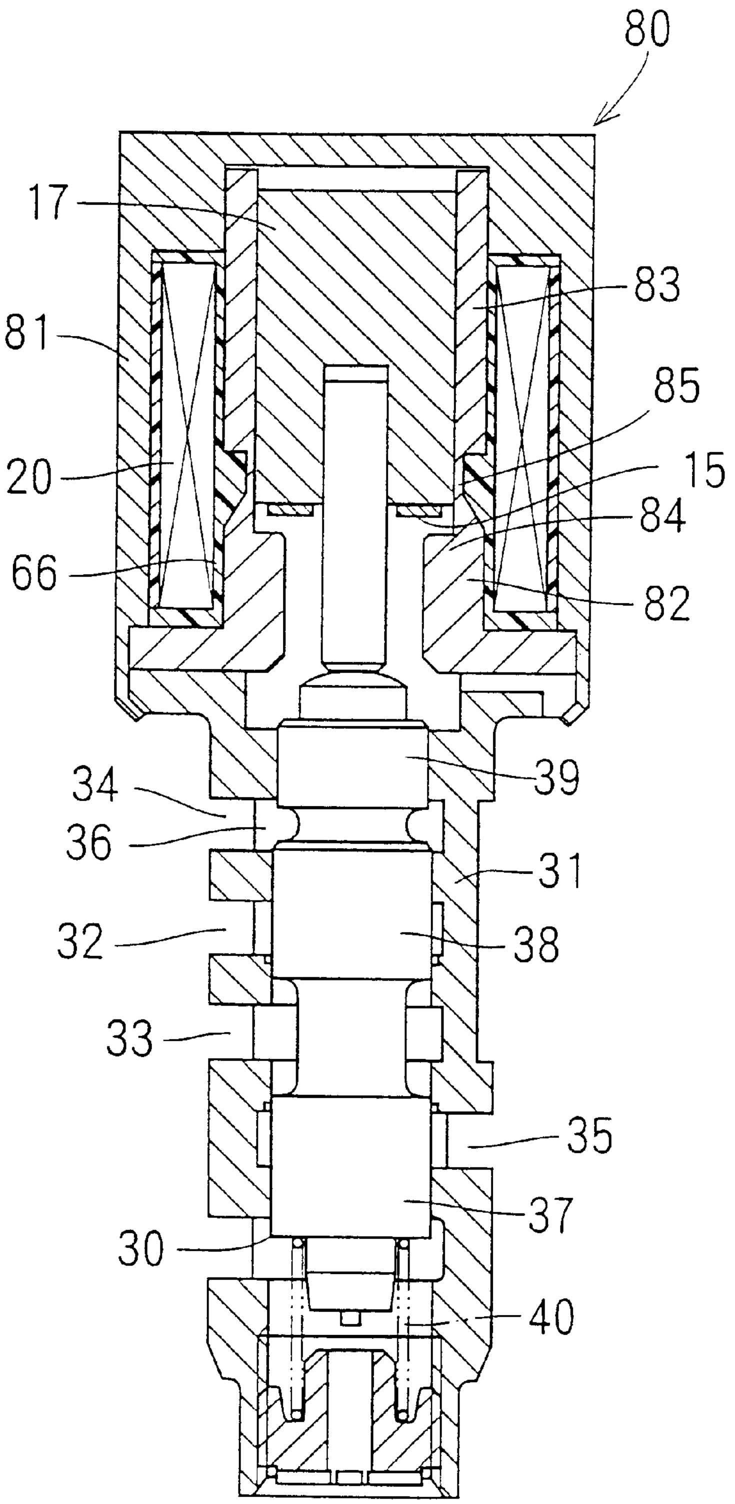
FIG. 7 is a cross-sectional view showing an electromagnetic valve (fifth embodiment).

FIG. 7 shows an electromagnetic valve 80 in the fifth embodiment. In the fifth embodiment, shapes of a yoke 81 and a stator core 82 are different from those in the third embodiment, and the stopper 15 is attached to the plunger 17. The stator core 82 includes an accommodating member 83, an attracting member 84, and a thin thick portion 85. The accommodating member 83, attracting member 84 and thin thick portion 85 are integrally formed, and the thin thick portion 85 connects the accommodating member 83 to the attracting member 84. Although shape of the stator core 82 is different from those in the third and fourth embodiments, the manufacturing processes of the stator core in the third and fourth embodiments may be used.

According to the above-described embodiments, since the accommodating member and the attracting member are accurately coaxially arranged, the radial clearances between the plunger 17 and the accommodating member, and between the plunger 17 and the attracting member are made as small as possible. Thus, the force attracting the plunger 17 is large relative to the electric current amount supplied into the coil 20.

In the above-described embodiments, the electromagnetic operating apparatus in the present invention is used for an electromagnetic operating section of the spool type oil pressure control apparatus. Alternatively, the electromagnetic operating apparatus in the present invention may be used for other fluid control apparatuses.

What is claimed is:

1. A method for manufacturing an electromagnetic operating apparatus, said electromagnetic operating apparatus including:

a moving core;

an accommodating member for accommodating said moving core such that said moving core reciprocates therein;

an attracting member disposed at one side of said accommodating member in a reciprocating direction of said moving core, said attracting member accommodating said moving core such that said moving core reciprocates therein, said attracting member forming a magnetic circuit with said moving core and said accommodating member;

a coil provided outside said accommodating member and said attracting member, said coil generating a magnetic force attracting said moving core toward said attracting member when energized; and a bobbin made of resin and around which said coil is wound;

the method for manufacturing said electromagnetic operating apparatus, comprising the steps of:

resin-insert-molding an accommodating base material of said accommodating member and an attracting base material of said attracting member, which is independent from said accommodating member, for forming a bobbin base material of said bobbin; and processing the resin-insert-molded accommodating base material and attracting base material for forming said accommodating member and said attracting member to accommodate said moving core such that said moving core reciprocates therein, wherein said step of processing comprises changing a shape of said accommodating base material to define a shape of said accommodating member and changing a shape of said attracting base material to define a shape of said attracting member.

2. A method for manufacturing an electromagnetic operating apparatus according to claim 1, further comprising the steps of winding said coil around said bobbin base material after forming said bobbin base material and before processing the resin-insert-molded accommodating base material and attracting base material.

3. A method for manufacturing an electromagnetic operating apparatus, said electromagnetic operating apparatus including:

a moving core;

an accommodating member for accommodating said moving core such that said moving core reciprocates therein;

an attracting member disposed at one side of said accommodating member in a reciprocating direction of said moving core, said attracting member accommodating said moving core such that said moving core reciprocates therein, said attracting member forming a magnetic circuit with said moving core and said accommodating member;

a coil provided outside said accommodating member and said attracting member, said coil generating, a magnetic force attracting said moving core toward said attracting member when energized; and a bobbin made of resin and around which said coil is wound;

the method for manufacturing said electromagnetic operating apparatus, comprising the steps of:

resin-insert-molding a stator core base material, which includes base materials of said accommodating member and attracting member, and which includes a thin thick portion integrally formed to connect the base materials to each other, for forming a bobbin base material of said bobbin; and processing the resin-insert-molded stator core base material for forming a stator core to accommodate said moving core such that said moving core reciprocates therein, wherein said step of processing comprises changing a shape of said stator core base material to form a shape of said stator core.

4. A method for manufacturing an electromagnetic operating apparatus according to claim 3, wherein the processed thin thick portion connects said accommodating member to said attracting member.

5. A method for manufacturing an electromagnetic operating apparatus according to claim 3, further comprising the steps of winding said coil around said bobbin base material after forming said bobbin base material and before processing the resin-insert-molded stator core base material.

6. The method of manufacturing an electromagnetic operating apparatus according to claim 1, wherein the attracting member has a concavity which accommodates the moving core at least when the moving core is attracted toward the attracting member, the concavity being defined by a bottom surface axially facing the moving core and a cylindrical surface radially facing the moving core at least when the moving core is attracted, and wherein the processing step forms the concavity in the attracting base material.

7. The method for manufacturing an electromagnetic operating apparatus according to claim 6, wherein the attracting member further has a through hole coaxial with the concavity, the through hole being smaller in diameter than the concavity.

8. The method for manufacturing an electromagnetic operating apparatus according to claim 3, wherein the attracting member has a concavity which accommodates the moving core at least when the moving core is attracted toward the attracting member, the concavity being defined by a bottom surface axially facing the moving core and a cylindrical surface radially facing the moving core at least when the moving core is attracted, and wherein the processing step forms the concavity in the attracting base material.

9. The method for manufacturing an electromagnetic operating apparatus according to claim 8, wherein the attracting member further has a through hole coaxial with the concavity, the through hole being smaller in diameter than the concavity.

10. A method for manufacturing an electromagnetic operating apparatus according to claim 1, further comprising the step of winding said coil around said bobbin base material after forming said bobbin base material and after processing the resin-insert-molded accommodating base material and attracting base material.

11. A method for manufacturing an electromagnetic operating apparatus according to claim 1, wherein said step of processing comprises cuffing the resin-insert-molded accommodating base material and attracting base material to define a bore for accommodating the moving core.

12. A method for manufacturing an electromagnetic operating apparatus according to claim 3, further comprising the step of winding said coil around said bobbin base material after forming said bobbin base material and after processing the resin-insert-molded stator corn base material.

13. A method for manufacturing an electromagnetic operating apparatus according to claim 3, wherein said step of processing comprises cutting the resin-insert-molded stator core base material to define a bore for accommodating the moving core.

14. A method for manufacturing an electromagnetic operating apparatus according to claim 3, wherein said processing step includes removing the thin-thick portion to divide the accommodating member from the attracting member.

15. A method for manufacturing an electromagnetic operating apparatus according to claim 13, wherein said cutting step includes removing the thin-thick portion to divide the accommodating member from the attracting member.

* * * * *